(12) United States Patent
Zhang

(10) Patent No.: US 11,430,254 B2
(45) Date of Patent: Aug. 30, 2022

(54) FINGERPRINT RECOGNITION CIRCUIT, FINGERPRINT RECOGNITION METHOD, AND DISPLAY DEVICE

(71) Applicant: Hubei Yangtze Industrial Innovation Center Of Advanced Display Co., Ltd., Wuhan (CN)

(72) Inventor: Bo Zhang, Shanghai (CN)

(73) Assignee: HUBEI YANGTZE INDUSTRIAL INNOVATION CENTER OF ADVANCED DISPLAY CO., LTD., Wuhan (CN)

(*) Notice: Subject to any disclaimer, the term of this patent is extended or adjusted under 35 U.S.C. 154(b) by 0 days.

(21) Appl. No.: 17/229,047

(22) Filed: Apr. 13, 2021

(65) Prior Publication Data
US 2021/0232795 A1    Jul. 29, 2021

(30) Foreign Application Priority Data
Jan. 28, 2021 (CN) .......................... 202110117849.7

(51) Int. Cl.
*G06V 40/13* (2022.01)
(52) U.S. Cl.
CPC ...... *G06V 40/1318* (2022.01); *G06V 40/1306* (2022.01)
(58) Field of Classification Search
None
See application file for complete search history.

(56) References Cited

U.S. PATENT DOCUMENTS

| 4,852,152 A * | 7/1989 | Honick ................ H04M 11/002 379/93.05 |
| 2017/0116917 A1* | 4/2017 | Sun ...................... G09G 3/3233 |

(Continued)

FOREIGN PATENT DOCUMENTS

| CN | 102376277 B | 5/2013 |
| CN | 110763336 A | 2/2020 |
| WO | 2020129439 A1 | 6/2020 |

OTHER PUBLICATIONS

State Intellectual Property Office of the People's Republic of China, First Office Action, Chinese Application No. 202110117849.7, dated Apr. 21, 2022, 21 pages.

*Primary Examiner* — Joseph R Haley
(74) *Attorney, Agent, or Firm* — Christensen O'Connor Johnson Kindness PLLC

(57) ABSTRACT

A fingerprint recognition circuit, a fingerprint recognition method, and a display device are provided. The fingerprint recognition circuit includes an acquisition module, an output module, and a light sensing detection module which includes a first transistor, a photosensitive unit electrically connected to a first node, and a storage capacitor electrically connected to the first node and a second fixed potential signal line. The first transistor includes a gate electrically connected to a charging control signal line, a first electrode electrically connected to a first fixed potential signal line, and a second electrode electrically connected to the photosensitive unit. The acquisition module is electrically connected to the first node and a third fixed potential signal line. When performing fingerprint recognition, the first transistor controls the photosensitive unit to charge the storage capacitor utilizing a photocurrent generated under illumination in response to a charging control signal.

19 Claims, 5 Drawing Sheets

(56) References Cited

U.S. PATENT DOCUMENTS

2020/0410203 A1* 12/2020 Chang ................ G06K 9/00087
2021/0313384 A1* 10/2021 Tada ................. H01L 31/03682
2021/0406508 A1* 12/2021 Shih ..................... G09G 3/3677

* cited by examiner

ND DISPLAY DEVICE

FINGERPRINT RECOGNITION CIRCUIT, FINGERPRINT RECOGNITION METHOD, AND DISPLAY DEVICE

CROSS-REFERENCE TO RELATED APPLICATIONS

The present application claims priority to Chinese Patent Application No. 202110117849.7, filed on Jan. 28, 2021, the content of which is incorporated herein by reference in its entirety.

TECHNICAL FIELD

The present disclosure relates to the field of display technology and, in particular, to a fingerprint recognition circuit, a fingerprint recognition method, and a display device.

BACKGROUND

With the rapid development of display technology, fingerprint recognition technology is widely used in display devices such as mobile phones and computers with unlocking functions. In order to realize the fingerprint recognition function, the display device is provided with multiple fingerprint recognition circuits at the position corresponding to the fingerprint recognition region. The fingerprint recognition circuit typically includes a photodiode and a switch transistor. When the finger touches the screen, light emitted by a light source illuminates the finger and is reflected by the finger to the photodiode, and the photodiode generates a photocurrent under the light. The photocurrent will cause a change in the potential of the detection node in the fingerprint recognition circuit, and then the valley and ridge of the fingerprint can be determined according to the change of the potential of the detection node.

However, based on the circuit structure of the fingerprint recognition circuit in the related art, the off-state leakage current of the switch transistor greatly affects the potential change of the detection node. For example, under low light illumination, the potential change of the detection node is likely to be insignificant, causing recognition failure.

SUMMARY

In view of this, the embodiments of the present disclosure provide a fingerprint identification circuit, a fingerprint identification method and a display device, aiming to improve the linearity of the fingerprint identification low-brightness area, increase the dynamic range and improve the fingerprint identification accuracy.

In a first aspect, an embodiment of the present disclosure provides a fingerprint recognition circuit. The fingerprint recognition circuit includes a light sensing detection module including a first transistor, a photosensitive unit and a storage capacitor. The first transistor includes a gate electrically connected to a charging control signal line, a first electrode electrically connected to a first fixed potential signal line, and a second electrode electrically connected to a cathode of the photosensitive unit; an anode of the photosensitive unit is electrically connected to a first node; and the storage capacitor includes a first plate electrically connected to the first node, and a second plate electrically connected to a second fixed potential signal line. The fingerprint recognition circuit further includes an acquisition module and an output module. The acquisition module includes a control terminal electrically connected to the first node, an input terminal electrically connected to a third fixed potential signal line, and an output terminal. The output module includes a control terminal electrically connected to a read control signal line, an input terminal electrically connected to the output terminal of the acquisition module, and an output terminal electrically connected to a read signal line. When performing fingerprint recognition, the first transistor controls, in response to a charging control signal, the photosensitive unit to charge the storage capacitor utilizing a photocurrent generated under illumination, the acquisition module acquires a potential change of the first node, and the output module outputs the potential change to the read signal line.

In a second aspect, an embodiment of the present disclosure further provides a fingerprint recognition method applied to the fingerprint recognition circuit described in the first aspect. The fingerprint recognition method includes: during a light sensing detection period of a fingerprint recognition cycle, providing, by the first transistor, a first fixed potential of the first fixed potential signal line to the cathode of the photosensitive unit in response to the charging control signal; charging, by the photosensitive unit, the storage capacitor utilizing the photocurrent generated under the illumination; acquiring, by the acquisition module, a potential of the first node in response to a read control signal of the read control signal line; and reading, by the output module, a signal of the first node in response to the read control signal.

In a third aspect, an embodiment of the present disclosure provides a display panel. The display device includes a display panel having a display region and a processor. At least a part of the display region is reused as a fingerprint recognition region, and the fingerprint recognition circuit described in the first aspect is provided in the fingerprint recognition region. The processor is electrically connected to the read signal line in the fingerprint recognition circuit and configured to recognize a fingerprint based on a signal read from the read signal line.

BRIEF DESCRIPTION OF DRAWINGS

In order to more clearly illustrate the embodiments of the present disclosure or the technical solutions in the related art, the accompanying drawings used in the description of the embodiments or the related art will be briefly introduced below. The drawings in the following description correspond to some embodiments of the present disclosure, and those skilled in the art may obtain other drawings based on these drawings.

DESCRIPTION OF EMBODIMENTS

In order to understand the technical solutions of the present disclosure better, the technical solutions in the embodiments of the present disclosure will be described in detail in conjunction with the drawings.

It should be noted that the embodiments described are some of the embodiments of the present disclosure, but not all the embodiments. Based on the embodiments of the present disclosure, other embodiments obtained by those of ordinary skill in the art fall within the protection scope of the present disclosure.

The terms used in the embodiments of the present disclosure are merely for the purpose of describing particular embodiments and not intended to limit the present disclosure. Unless otherwise noted in the context, the singular form expressions "a", "an", "the" and "said" used in the embodiments and appended claims of the present disclosure are also intended to represent a plural form.

It should be understood that the term "and/or" as used herein is merely an association describing the associated objects, indicating that there may be three relationships. For example, A and/or B may indicate three cases: A alone; A and B; B alone. In addition, a character "/" herein generally indicates that the contextual objects are in an "or" relationship.

It should be understood that although the terms first, second, third, etc. can be used to describe transistors in the embodiments of the present disclosure, these transistors should not be limited to these terms. These terms are only used to distinguish transistors from one another. For example, without departing from the scope of the embodiments of the present disclosure, the first transistor can also be referred to as the second transistor, and similarly, the second transistor can also be referred to as the first transistor.

Depending on the context, the word "if" used herein can be interpreted as "at the moment" or "when" or "in response to determination" or "in response to detection". Similarly, depending on the context, the phrase "if . . . is determined" or "if . . . is detected (statement or event)" can be interpreted as "when . . . is determined" or "in response to determining" or "when . . . is detected (statement or event)" or "response to detecting (statement or event)".

Before describing the technical solutions provided by embodiments of the present disclosure, the problems in the related art are illustrated.

Figure 1:
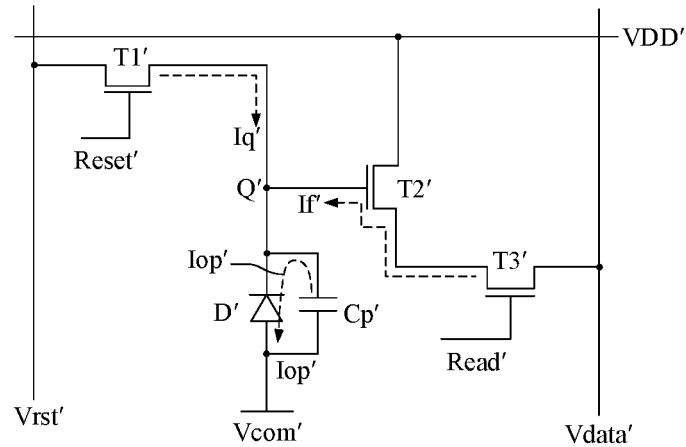
FIG. 1 is a schematic diagram of a fingerprint recognition circuit in the related art.
Figure 2:
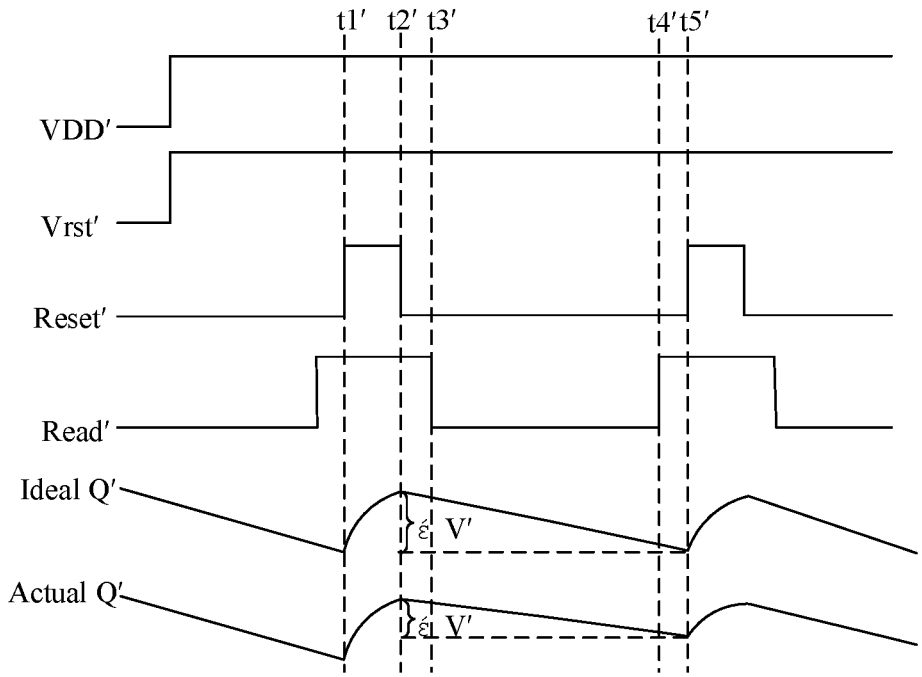
FIG. 2 is a timing sequence corresponding to FIG. 1.

FIG. 1 is a schematic diagram of a fingerprint recognition circuit in the related art. As shown in FIG. 1, the fingerprint recognition circuit includes a first transistor T1', a second transistor T2', a third transistor T3' and a photodiode D'. In conjunction with the timing sequence shown in FIG. 2, a recognition cycle of the fingerprint recognition circuit includes a reset period t1'-t2' and an exposure period t2'-t5'.

During the reset period t1'-t2', the first transistor T1' is turned on under a high level provided by a reset signal line Reset', and a first fixed potential signal provided by a first fixed potential signal line Vrst' charges an equivalent parasitic capacitance Cp' via the photodiode D', so that a potential of the first node Q' is raised to an initial potential.

During the exposure period t2'-t5', the first transistor T1' is turned off, a finger touches the display panel, light emitted by a light source irradiates the finger and is reflected, and the reflected light is projected to the photodiode D' so that the photodiode D' generates charges under the light to form a photocurrent. At this time, the equivalent parasitic capacitance Cp' of the photodiode D' is discharged, and the potential of the first node Q' shows a downward trend during this period.

During the exposure period t2'-t5', the potential of the first node Q' is read twice. In a first reading period t2'-t3', the third transistor T3' is turned on under the high level provided by a read signal line Read', and the read signal line Vdata' reads the potential of the first node Q' for the first time. During a second read period t4'-t5', the third transistor T3' is turned on again, and the read signal line Vdata' reads the potential of the first node Q' for a second time. The difference between the detection signals that were read twice can indicate a potential difference ΔV' of the first node Q' under the photocurrent. The magnitude of the potential difference ΔV' of the first node Q' will then indicate the magnitude of the photocurrent. Since the intensities of the reflected light reflected by the fingerprint valley and by the fingerprint ridge are different, the photocurrent generated by the photodiode D' is also different. Therefore, by judging the potential difference ΔV' of the first node Q' at different positions, the fingerprint valley and ridge can be detected to realize the fingerprint recognition.

In an ideal state, the potential difference ΔV' of the first node Q' is only related to the magnitude of the photocurrent, $$\Delta V' = \frac{Iop' \times (t5' - t2')}{Cp'},$$

but in actual situations, the potential difference ΔV' will also be affected by other interference currents.

First, a large off-state leakage current Iq' is present when turning off the first transistor T1'. The off-state leakage current Iq' flows along a direction opposite to a direction along which the photocurrent Iop' flows. Therefore, the off-state leakage current Iq' has an effect on the first node Q' opposite to an effect of the photocurrent Iop' on the first node Q'. For example, when the light intensity is low, the photocurrent Iop' generated by the photodiode D' is relatively small, and when the photocurrent Iop' reaches an order of magnitude same as the off-state leakage current Iq', the off-state leakage current Iq' causes that the potential of the first node Q' can hardly drop further. Secondly, when the third transistor T3' is turned on, the equivalent parasitic capacitances of the second transistor T2' and the third transistor T3' also increase the potential of the first node Q', so that the potential of the first node Q' cannot drop to an ideal state, which results in a poor linearity of the potential change of the first node Q'. Compared with the ideal state the actual potential difference ΔV' of the first node Q' is only $$\frac{(Iop' - Iq' - If') \times (t5' - t2')}{Cp'},$$

where If' denotes an interference current generated by the equivalent parasitic capacitances of the second transistor T2' and the third transistor T3'. Therefore, the ΔV' under low light illumination is too small, which in turn causes that the potential change is insignificant and cannot be detected.

With the above analysis, it can be learned that the prior art uses the discharge of the equivalent parasitic capacitance Cp' of the photodiode D' to achieve light sensing detection. Due to the factors such as process precision, the capacitance values of the equivalent parasitic capacitances Cp' of the photodiodes D' in different fingerprint recognition circuits are different from each other, so that the potential differences ΔV' of the first nodes Q' in different fingerprint recognition circuits under the same illumination condition also have a certain difference, resulting in a fixed pattern noise which affects the accuracy of recognition.

Figure 3:
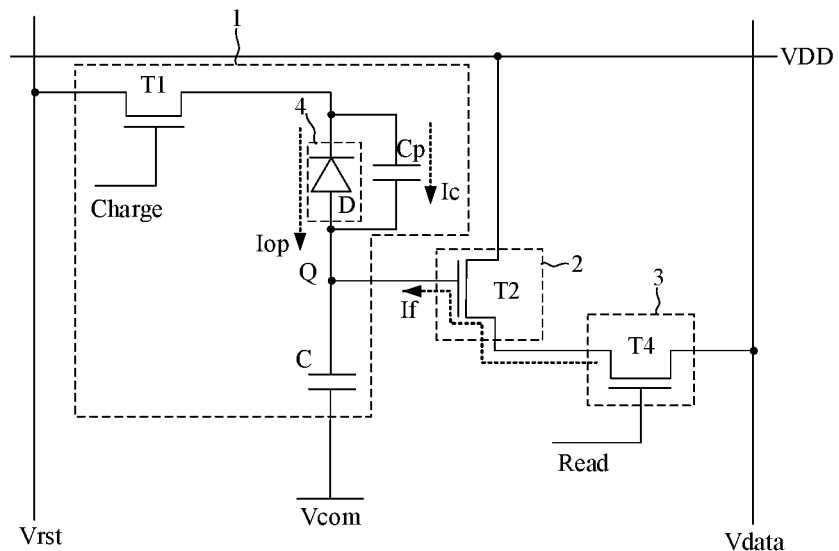
FIG. 3 is a schematic diagram of a fingerprint recognition circuit provided by an embodiment of the present disclosure.

An embodiment of the present invention provides a fingerprint recognition circuit. FIG. 3 is a schematic diagram of a fingerprint recognition circuit provided by an embodiment of the present invention. As shown in FIG. 3, the fingerprint recognition circuit includes a light sensing detection module 1, an acquisition module 2, and an output module 3.

The light sensing detection module 1 includes a first transistor T1, a photosensitive unit 4, and a storage capacitor C. The first transistor T1 has a gate electrically connected to a charging control signal line Charge, a first electrode electrically connected to a first fixed potential signal line Vrst, and a second electrode electrically connected to a cathode of the photosensitive unit 4. An anode of the photosensitive unit 4 is electrically connected to a first node Q. The storage capacitor C includes a first plate electrically connected to the first node Q, and a second plate electrically connected to a second fixed potential signal line Vcom. The embodiments of the present invention take the first transistor T1 being an N-type transistor as an example, but other types of transistors (e.g., a P-type transistor) may be used in different embodiments.

The acquisition module 2 includes a control terminal electrically connected to the first node Q, and an input terminal electrically connected to a third fixed potential signal line VDD.

The output module 3 includes a control terminal electrically connected to a read control signal line Read, an input terminal electrically connected to an output terminal of the acquisition module 2, and an output terminal electrically connected to a read signal line Vdata.

When performing fingerprint recognition, the first transistor T1 controls, in response to a charging control signal, the photosensitive unit 4 to charge the storage capacitor C utilizing a photocurrent generated under illumination, the acquisition module 2 acquires a potential change of the first node Q which is then output by the output module 3 to the read signal line V data.

It should be noted that the related art realizes light sensing detection by utilizing the discharge of the equivalent parasitic capacitance Cp' of the photodiode D'. Contrary to the prior art technology, in the embodiment of the present disclosure, light sensing detection is realized by adjustment of a position of the photosensitive unit 4 and addition of a storage capacitor C in the fingerprint recognition circuit.

Figure 4:
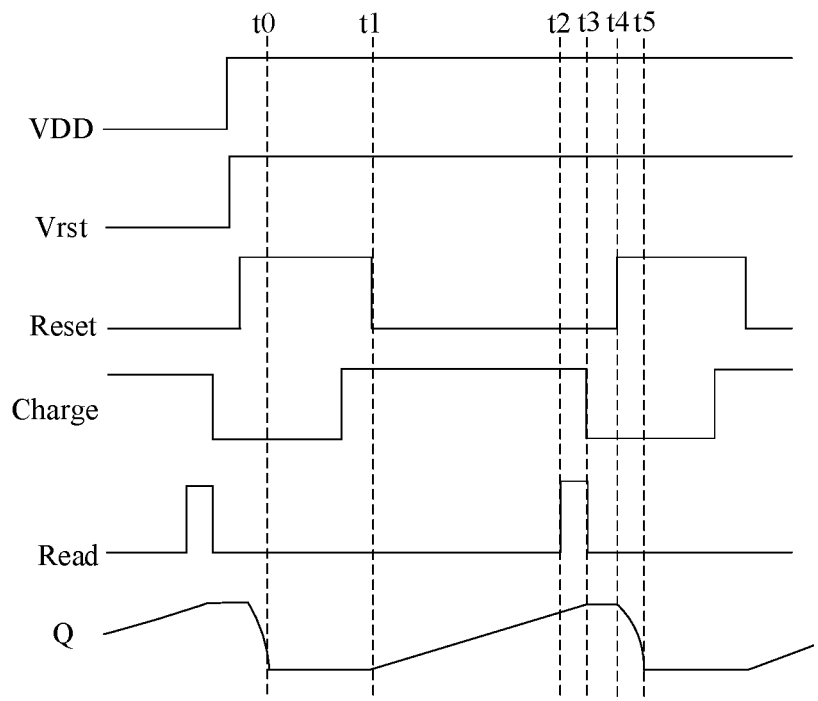
FIG. 4 is a timing sequence corresponding to FIG. 3.

In conjunction with the timing sequence shown in FIG. 4, a fingerprint recognition cycle includes a light sensing detection period t1-t3. During the light sensing detection period t1-t3, the first transistor T1 provides, in response to a high level provided by the charging control signal line Charge, a first fixed potential signal provided by the first fixed potential signal line Vrst to the cathode of the photosensitive unit 4, and the photosensitive unit 4 generates a photocurrent Top under the light to charge the storage capacitor C, thereby converting a change of the current signal to a change of the voltage of the first node Q using the storage capacitor C, and raising the potential of the first node Q; and the acquisition module 2 acquires the potential of the first node Q and outputs a detection signal for indicating the potential of the first node Q, and the output module 3 transmits the received detection signal to the read signal line Vdata under the read control signal provided by the read control signal line Read, the read signal line Vdata outputs the detection signal to a processor, and the processor then judges the valley and ridge of the fingerprint according to the detection signal.

That is, in the embodiment of the present invention, the light sensing detection is realized by using the photosensitive unit 4 to charge the storage capacitor C. Based on this detection method, the photocurrent Top generated by the photosensitive unit 4 flows into the first node Q, so that the potential of the first node Q is in an upward trend during the light sensing detection period t1-t3.

Figure 5:
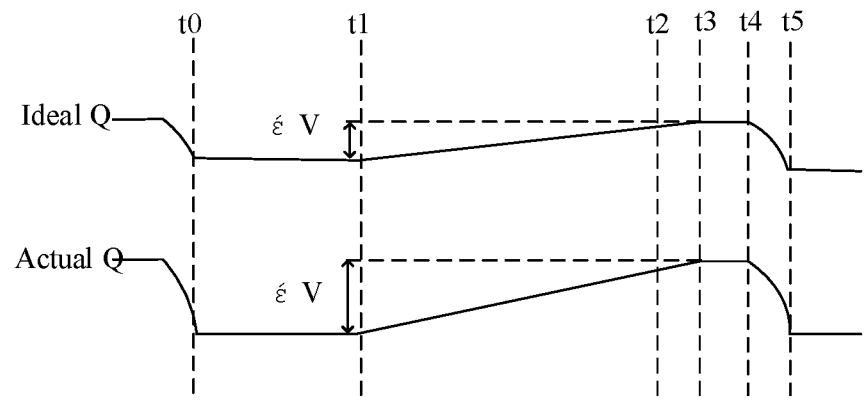
FIG. 5 is a schematic diagram showing potential changes of a first node in an ideal state and in a real state according to an embodiment of the present disclosure.

With such configuration, on the one hand, the photosensitive unit 4 is arranged between the first transistor T1 and the first node Q, and the potential of the first node Q is no longer affected by the off-state leakage current of the first transistor T1, thus avoiding that the off-state leakage current of the first transistor T1 affects the potential change of the first node Q. On the other hand, in combination with the schematic diagram of the potential change of the first node in the ideal state and in the real state shown in FIG. 5, in the ideal state, the potential change of the first node Q is only related to the photocurrent Top, and the potential difference of the first node Q is $$\Delta V = \frac{Iop \times (t3 - t1)}{C}.$$

In real situations, even if the influence of other interference currents, such as the interference current If generated by the equivalent parasitic capacitance of the transistors in the acquisition module 2 and the output module 3 and the interference current Ic generated by the equivalent parasitic capacitance Cp of the photosensitive unit 4, are taken into account, since the flowing direction of the photocurrent Iop of the photosensitive unit 4 changes in the embodiment of the present invention, the photocurrent Top, the interference current If and the interference current Ic have the same flowing direction and all flow into the first node Q. At this time, the interference current If and the interference current Ic affect the change of the potential of the first node Q in the same direction as the photocurrent Top does, and the actual potential difference of the first node Q is $$\Delta V = \frac{(Iop + If + Ic) \times (t3 - t1)}{C}.$$

Even under light illumination of a relatively low intensity, the linearity of the change of the potential of the first node Q will not be reduced, thereby avoiding the situation where the change of the potential of the first node Q cannot be detected due to an insignificant change.

Moreover, an embodiment of the present invention achieves light sensing detection by charging the storage capacitor C using the photosensitive unit 4 instead of using the equivalent parasitic capacitance Cp of the photosensitive unit 4. Therefore, the accuracy of fingerprint recognition will not be affected by a difference in the equivalent parasitic capacitance Cp of the photosensitive unit 4 in different fingerprint recognition circuits, and the fixed pattern noise between different fingerprint recognition circuits is reduced.

Therefore, the fingerprint recognition circuit provided by the embodiment of the present invention can not only eliminate or alleviate the problem of a poor linearity of the potential change of the first node Q at low brightness due to the off-state leakage current of the transistor and other interference currents, but also allow the potential change of the first node Q to reflect the magnitude of the photocurrent in a larger range, increase the dynamic detection range, and reduce the fixed pattern noise between different fingerprint recognition circuits, thereby effectively improving the accuracy of fingerprint recognition.

In addition, it should be noted that, in order to reduce the fixed pattern noise between different fingerprint recognition circuits to a greater extent, a storage capacitor C with a higher capacitance precision is used in an embodiment of the present invention. For example, by increasing the facing area of the two plates of the storage capacitor C or increasing the distance between the two plates of the storage capacitor C, the capacitance error caused by factors such as process errors can be reduced, so that the storage capacitor C has higher capacitance precision.

In an embodiment, a capacitance value of the storage capacitor C is greater than a capacitance value of the equivalent parasitic capacitance Cp of the photosensitive unit 4. It can be understood that since the photosensitive unit 4 itself has the equivalent parasitic capacitance Cp, it is inevitable that the photosensitive unit 4 charges its own equivalent parasitic capacitance Cp to a certain extent, while the photosensitive unit 4 charges the storage capacitor C using the photocurrent Iop. By setting the capacitance value of the storage capacitor C to be greater than the capacitance value of the equivalent parasitic capacitance Cp, the photocurrent Top can charge the storage capacitor C to a greater extent, and thus the influence of the equivalent parasitic capacitance Cp on the charging of the storage capacitor C can be ignored.

In an embodiment, referring to FIG. 3 again, the acquisition module 2 includes a second transistor T2, the second transistor T2 includes a gate electrically connected to the first node Q, and a first electrode electrically connected to the third fixed potential signal line VDD.

During the light sensing detection period t1-t3, the second transistor T2 is in a follower state, and a source-drain current Ids of the second transistor T2 is independent from a source-drain voltage Vds but increases as a gate-source voltage Vgs increases. When the potential of the first node Q is relatively high, the gate-source voltage Vgs of the second transistor T2 is relatively high, and the current output by the second transistor T2 is also relatively high. Correspondingly, the intensity of the detection signal that is read by the read signal line Vdata and used to indicate the potential of the first node Q is relatively high. When the potential of the first node Q is relatively low, the gate-source voltage Vgs of the second transistor T2 is relatively small, and the output current of the second transistor T2 is also relatively small. Correspondingly, the intensity of the detection signal read by the read signal line Vdata and used to indicate the potential of the first node Q is relatively small. The degree of change of the potential of the first node Q is determined according to the intensity of the detection signal, and then the magnitude of the photocurrent is determined, so as to judge the valleys and ridges of the fingerprint.

Figure 6:
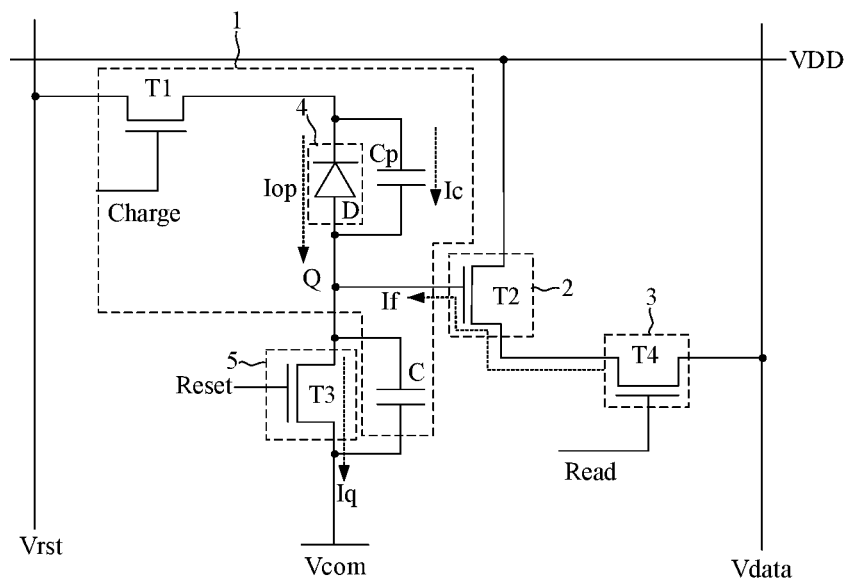
FIG. 6 is a schematic diagram of another fingerprint recognition circuit provided by an embodiment of the present disclosure.

FIG. 6 is a schematic diagram of another fingerprint recognition circuit provided by an embodiment of the present invention. In an embodiment, as shown in FIG. 6, the fingerprint recognition circuit further includes a reset module 5, and the reset module 5 includes a control terminal electrically connected to a reset control signal line Reset, an input terminal electrically connected to the second fixed potential signal line Vcom, and an output terminal electrically connected to the first node Q. The reset module 5 is configured to provide a second fixed potential to the first node Q in response to a reset control signal.

Based on the above-described structure, the fingerprint recognition cycle further includes a reset period. The reset period can occur prior to the light sensing detection period t1-t3, and/or after the light sensing detection period t1-t3. For example, referring to FIG. 4 again, the reset period can include a first reset sub-period t0-t1 prior to the light sensing detection period t1-t3 and a second reset sub-period t4-t5 after the light sensing detection period t1-t3.

Before the start of the light sensing detection period t1-t3 and/or after the end of the light sensing detection period t1-t3, the reset module 5 provides the second fixed potential to the first node Q in response to the reset control signal, to reset the potential of first node Q in such a manner that the first node Q maintains a stable reset potential before and/or after the light sensing detection, which can eliminate detection failure caused by the unstable initial potential of the first node Q before detection.

In an embodiment, the second transistor T2 is an N-type transistor, and the second fixed potential is greater than a turn-on potential of the second transistor T2. As a result, during the reset period, the potential of the first node Q is set to a potential that is greater than the turn-on potential of the second transistor T2. And during the subsequent light sensing detection period t1-t3, when the potential of the first node Q is further raised under the photocurrent Iop, it can ensure that the gate-source voltage Vgs of the second transistor T2 is always greater than the turn-on potential of the second transistor T2 to ensure that the second transistor T2 operates in the follower state, and thus the output current thereof changes with the change of the potential of the first node Q.

In an embodiment, referring to FIG. 6 again, the reset module 5 includes a third transistor T3, the third transistor T3 includes a gate electrically connected to the reset control signal line Reset, a first electrode electrically connected to the second fixed potential signal line Vcom, and a second electrode electrically connected to the first node Q. Specifically, the embodiment of the present disclosure takes the third transistor T3 being an N-type transistor as an example. During the reset period, the third transistor T3 is turned on under a high level provided by the reset control signal line Reset, and the second fixed potential signal provided by the second fixed potential signal line Vcom is transmitted to the first node Q to reset the first node Q.

It should be noted that during the light sensing detection period t1-t3, the third transistor T3 is in a turn-off state, and an off-state leakage current Iq flows through the third transistor T3. Since the potential of the first node Q is raised during this period, the off-state leakage current Iq flows out of the first node Q. At this time, the off-state leakage current Iq has an effect on the potential of the first node Q opposite to the effect of the interference current If and the interference current Ic on the potential of the first node Q. The actual potential difference of the first node Q is $$\Delta V = \frac{(Iop + If + Ic - Iq) \times (t3 - t1)}{C}.$$

It can be seen that the off-state leakage current Iq of the third transistor T3 will counteract the interference current If and the interference current Ic, thereby weakening the overall effect of these currents on the potential change of the first node Q. In this way, the actual potential difference ΔV of the first node Q is closer to a potential difference thereof in the ideal state, thus improving the accuracy of fingerprint recognition.

In addition, it should be noted that, generally, the interference current If is relatively large, therefore, If+Ic is generally greater than Iq, so that the off-state leakage current Iq, the interference current If, and the interference current Ic still have a positive enhancement effect on the potential change of the first node Q and do not reduce the linearity of the potential change of the first node Q. Alternatively, it is also possible to adjust the size and layers of the third transistor T3, the second transistor T2 or the transistor in the output module 3 to make If+Ic=Iq, so that the actual potential difference ΔV of the first node Q is equal to the potential difference in the ideal state.

In an embodiment, the third transistor T3 can be a low-temperature polycrystalline oxide transistor or an amorphous silicon transistor. Since there is no inverse state of a p-channel in the low-temperature polycrystalline oxide transistor and the amorphous silicon transistor has characteristics of low mobility and low conductivity, when the third transistor T3 is the low-temperature polycrystalline oxide transistor or the amorphous silicon transistor, the off-state leakage current Iq of the third transistor T3 is small, which prevents the off-state leakage current Iq from being greater than If+Ic, thereby avoiding degradation of the linearity of the potential change of the first node Q at a low brightness, and allowing better acquisition of the potential change of the first node Q.

In an embodiment, a width to length ratio of the third transistor T3 is smaller than a width to length ratio of the first transistor T1, so that the third transistor T3 has a relatively small off-state leakage current Iq by reducing the width to length ratio of the third transistor T3.

Figure 7:
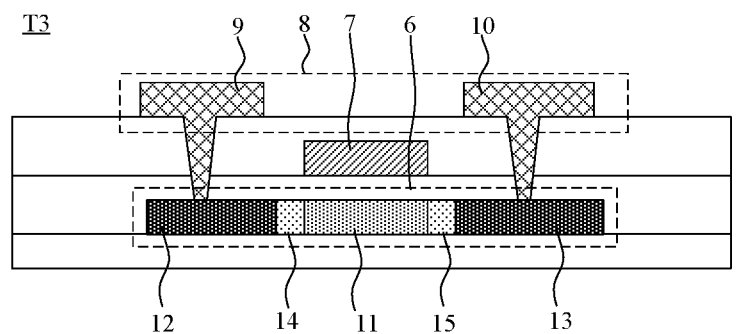
FIG. 7 is a schematic structural diagram of layers of a third transistor provided by an embodiment of the present disclosure.

FIG. 7 is a schematic diagram of layers of the third transistor T3 provided by an embodiment of the present disclosure. As shown in FIG. 7, the third transistor T3 includes an active layer 6, a gate layer 7, and a source-drain layer 8 that are stacked. The source-drain layer 8 includes a first electrode 9 and a second electrode 10, and the active layer 6 includes a channel region 11, a first heavily doped region 12, and a second heavily doped region 13. The first electrode 9 of the second transistor T2 is electrically connected to the first heavily doped region 12, and the second electrode 10 of the second transistor T2 is electrically connected to the second heavily doped region 13. A first lightly doped region 14 is provided between the first heavily doped region 12 and the channel region 11, and a second lightly doped region 15 is provided between the second heavily doped region 14 and the channel region 11.

By controlling the doping concentration of the first lightly doped region 14, the doping concentration of the second lightly doped region 15, and the doping concentration of the overall doped region in the active layer 6, the conductivity of the third transistor T3 can be reduced, so that the off-state leakage current Iq generated between the first electrode and the second electrode of the third transistor T3 can be reduced when the third transistor T3 is turned off.

Figure 8:
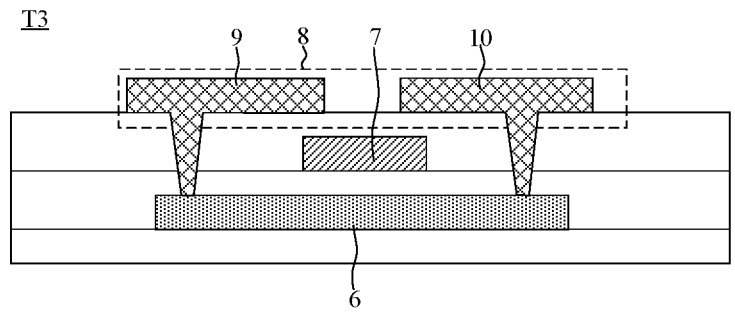
FIG. 8 is a schematic structural diagram of layers of another third transistor provided by an embodiment of the present disclosure.

FIG. 8 is a schematic diagram of layers of the third transistor T3 provided by another embodiment of the present disclosure. As shown in FIG. 8, the third transistor T3 includes an active layer 6, a gate layer 7, and a source-drain layer 8 that are stacked. The source-drain layer 8 includes a first electrode 9 and a second electrode 10, and, in a direction perpendicular to a plane of the active layer 6, an orthographic projection of the source-drain layer 8 and the gate layer 7 covers the active layer 6, so that the source-drain layer 8 and the gate layer 7 shield the active layer 6 to prevent ambient light or light reflected by fingers from irradiating on the active layer 6 to accelerate the flowing of carriers, thereby preventing the third transistor T3 from generating a large off-state leakage current Iq.

Figure 9:
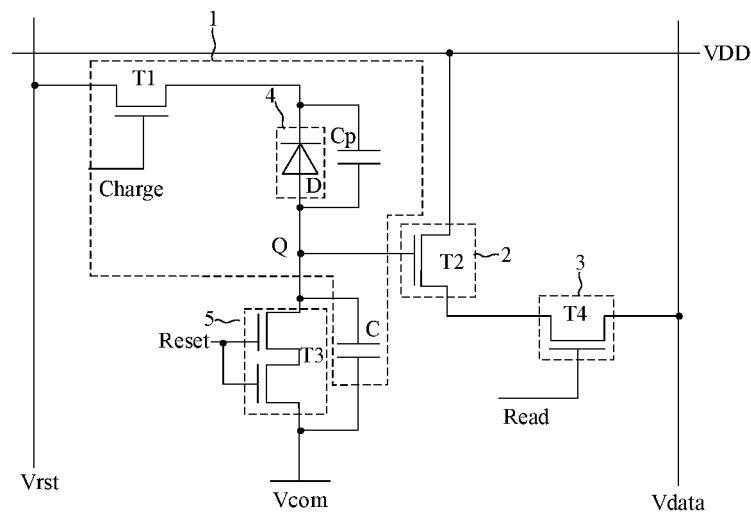
FIG. 9 is a schematic diagram of still another fingerprint recognition circuit provided by an embodiment of the present disclosure.

FIG. 9 is a schematic diagram of another fingerprint recognition circuit provided by an embodiment of the present disclosure. As shown in FIG. 9, the third transistor T3 is a double-gate transistor, thereby increasing a length of the third transistor T3 in the layout design, reducing the width to length ratio of the third transistor T3 and further reducing the off-state leakage current Iq of the third transistor T3.

In an embodiment, referring to FIG. 3 again, the output module 3 includes a fourth transistor T4, and the fourth transistor T4 includes a gate electrically connected to the read control signal line Read, a first electrode electrically connected to the second electrode of the second transistor T2, and a second electrode electrically connected to the read signal line Vdata. The embodiment of the present invention is illustrated by taking the fourth transistor T4 being an N-type transistor as an example. The fourth transistor T4 is turned on under the high level provided by the read control signal line Read, and the signal output by the second electrode of the second transistor T2 is transmitted to the read signal line Vdata through the turned-on fourth transistor T4.

In an embodiment, referring to FIG. 3 again, the photosensitive unit 4 includes a photodiode D. With such configuration, in a fixed layout space, the design size of the photodiode D can be increased, thereby improving the photoelectric conversion performance of the photodiode D.

Figure 10:
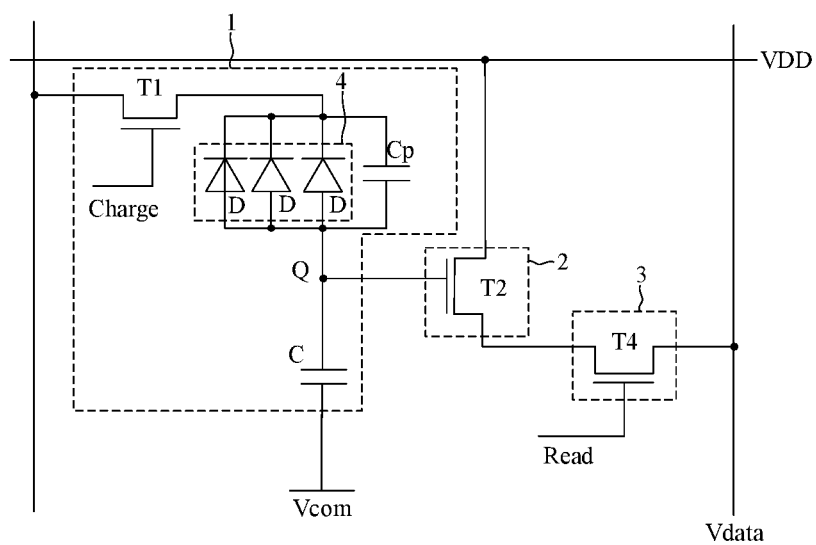
FIG. 10 is a schematic diagram of still another fingerprint recognition circuit provided by an embodiment of the present disclosure.

FIG. 10 is a schematic diagram of a fingerprint recognition circuit provided by another embodiment of the present disclosure. As shown in FIG. 10, the photosensitive unit 4 includes at least two photodiodes D connected in parallel. The photodiodes D that are connected in parallel charge the storage capacitor C at the same time, which increases the change amount of the potential of the first node Q, thereby improving the linearity of the detection signal and reducing the recognition difficulty.

In an embodiment, the storage capacitor C is a temperature compensation capacitor, used to compensate changes of circuit performances caused by temperature changes. For example, when the capacitance value of the equivalent parasitic capacitance Cp of the photosensitive unit 4 changes in a negative direction with temperature, the storage capacitor C can be set as a temperature compensation capacitor whose capacitance value changes in a positive direction with temperature.

Based on the same concept, an embodiment of the present disclosure provides a fingerprint recognition method, which is applied to the above fingerprint recognition circuit. With reference to FIGS. 3 and 4, the fingerprint recognition method includes: during the light sensing detection period t1-t3 of the fingerprint recognition cycle, providing, by the first transistor T1, the first fixed potential to the cathode of the photosensitive unit 4 in response to the charging control signal; charging, by the photosensitive unit 4, the storage capacitor C using the photocurrent generated under light illumination; acquiring, by the acquisition module 2, the potential of the first node Q in response to the read control signal; and reading, by the output module 3, the signal of the first node Q in response to the read control signal.

The principle of light sensing detection has been described in detail in the foregoing embodiments, and will not be repeated herein.

The fingerprint recognition method provided by the embodiment of the present invention realizes light sensing detection by using the photosensitive unit 4 to charge the storage capacitor C. Based on this detection method, the flowing direction of the photocurrent Top of the photodiode D changes, and the photocurrent Top, the interference current If generated by the equivalent parasitic capacitance of the transistors in the acquisition module 2 and the output module 3 and the interference current Ic generated by the equivalent parasitic capacitance Cp of the photodiode D flow along the same direction, so that the interference current If and the interference current Ic affect the potential change of the first node Q in a same direction as the photocurrent Top does. Therefore, even under the low light intensity, the linearity of the potential change of the first node Q will not be reduced, thereby avoiding the detection failure caused by an insignificant change of the potential of the first node Q.

Moreover, in the embodiment of the present invention, the detection is realized without utilizing the equivalent parasitic capacitance Cp of the photosensitive unit 4. Therefore, the accuracy of fingerprint recognition will not be affected by the difference in the equivalent parasitic capacitance Cp of the photosensitive unit 4 in different fingerprint recognition circuits, and the fixed pattern noise between different fingerprint recognition circuits is reduced.

In an embodiment, referring to FIG. 3 again, the acquisition module 2 includes a second transistor T2, and the second transistor T2 includes a gate electrically connected to the first node Q, and a first electrode electrically connected to the third fixed potential signal line VD. The output module 3 includes a fourth transistor T4, and the fourth transistor T4 includes a gate electrically connected to the read control signal line Read, a first electrode electrically connected to the second electrode of the second transistor T2, and a second electrode electrically connected to the read signal line Vdata.

Based on the above circuit structure, referring to FIG. 4 again, the light sensing detection period t1-t3 includes a first detection sub-period t1-t2 and a second detection sub-period t2-t3. During the first detection sub-period t1-t2, the first transistor T1 provides a first fixed potential to the cathode of the photosensitive unit 4 in response to the charging control signal, the photosensitive unit 4 charges the storage capacitor C by using the photocurrent generated under light illumination, and raises the potential of the first node Q. At this time, the second transistor T2 is in the follower state, the current output by the second transistor T2 changes with the change of the potential of the first node Q. During the second detection sub-period t2-t3, the photosensitive unit 4 continues to charge the storage capacitor C, and the fourth transistor T4 transmits the detection signal output by the second transistor T2 to the read signal line Vdata in response to the read control signal, so as to read the detection signal indicating the potential change of the first node Q.

In the above recognition method, the detection signal is read only once during the second detection sub-period t2-t3 of the light sensing detection period t1-t3. At this time, the processor can only determine the magnitude of the potential of the first node Q according to the magnitude of intensity of the read detection signal, and then determine the magnitude of the photocurrent; or a reference detection signal can be stored in the processor, and the processor determines the degree of potential change of the first node Q according to the magnitude of the difference between the read detection signal and the reference detection signal, and then determine the magnitude of the photocurrent.

In an embodiment, referring to FIG. 6 again, the fingerprint recognition circuit further includes a reset module 5 which is electrically connected to the first node Q, the reset control signal line Reset, and the second fixed potential signal line Vcom, respectively.

Based on the above circuit structure, the fingerprint recognition cycle further includes a reset period before the first detection sub-period t1-t2 and/or after the second detection sub-period t2-t3. During the reset period, the reset module 5 provides the second fixed potential to the first node Q in response to the reset control signal.

Before the start of the light sensing detection period t1-t3 and/or after the end of the light sensing detection period t1-t3, the reset module 5 resets the potential of the first node Q using the second fixed potential, so that the first node Q maintains a stable reset potential before and/or after the light sensing detection, avoiding the detection failure caused by the unstable initial potential of the first node Q before the detection.

In an embodiment, the second transistor T2 is an N-type transistor, and the second fixed potential is greater than the turn-on potential of the second transistor T2, so that the potential of the first node Q is set to be greater than the turn-on potential of the second transistor T2 during the reset period. And during subsequent light sensing detection period t1-t3, when the potential of the first node Q is further raised under the photocurrent Top, it is ensured that the gate-source voltage Vgs of the second transistor T2 is always greater than the turn-on potential of the second transistor T2, thereby ensuring that the second transistor T2 operates in a follower state, and thus the output current of the second transistor T2 changes with the change of the potential of the first node Q.

In an embodiment, referring to FIG. 4 again, the reset period includes a first reset sub-period t0-t1 before the first detection sub-period t1-t2 and a second reset sub-period t4-t5 after the second detection sub-period t2-t3. The fingerprint recognition cycle further includes a potential maintaining period t3-t4 between the second detection sub-period t2-t3 and the second reset sub-period t4-t5. During the potential maintaining period t3-t4, the first transistor T3 and the fourth transistor T4 are turned off, the photosensitive unit 4 stops charging the storage capacitor C, and the fourth transistor T4 also stops reading the detection signal. During this period, the potential of the first node Q tends to be stable, so as to be better reset during the second reset sub-period t4-t5.

Figure 11:
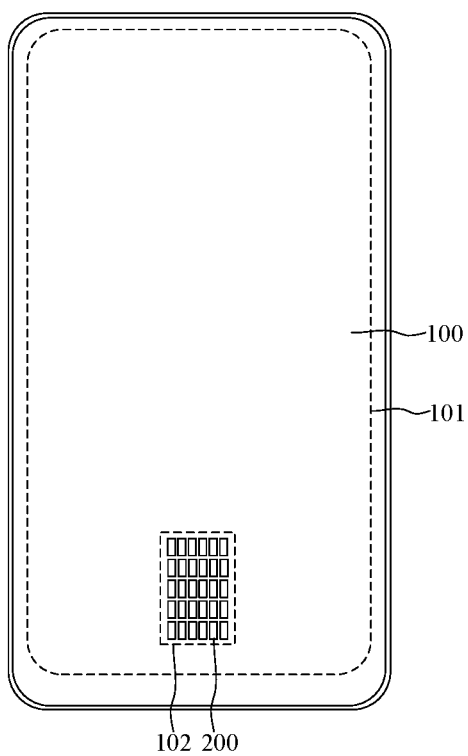
FIG. 11 is a schematic diagram of a display device provided by an embodiment of the present disclosure.

Based on the same concept, an embodiment of the present invention provides a display device. FIG. 11 is a schematic diagram of the display device provided by the embodiment of the present invention. As shown in FIG. 11, the display device includes a display panel 100. At least part of a display region 101 of the display panel 100 is reused as a fingerprint recognition region 102. A fingerprint recognition circuit 200, as described in a forgoing embodiment, is provided in the fingerprint recognition region 102. In addition, the display device further includes a processor (not shown in the figure)

electrically connected to the read signal line Vdata in the fingerprint recognition circuit, and the processor is configured to recognize fingerprints according to a signal read from the read signal line Vdata.

The specific structure of the fingerprint recognition circuit 200 has been described in detail in the above-mentioned embodiments, and will not be repeated herein. The display device shown in FIG. 11 is only illustrative, and the display device can be any electronic device with a display function, such as a mobile phone, a tablet computer, a notebook computer, an electronic paper book, or a television.

The above are only exemplary embodiments of the present disclosure and are not intended to limit the present disclosure. Any modification, equivalent replacement, improvement, etc. made within the principle of the present disclosure should be included in the protection scope of the present disclosure.

Finally, it should be noted that the various embodiments above are only used to illustrate the technical solutions of the present disclosure, rather than limiting the present disclosure; although the present disclosure has been described in detail with reference to the various embodiments above, those ordinary skilled in the art should understand that they can still modify the technical solutions described in the various embodiments above or equivalently replace some or all of the technical features, while these modifications or replacements do not cause the essence of the corresponding technical solutions to depart from the scope of the technical solutions of the various embodiments of the present disclosure.

What is claimed is:

1. A fingerprint recognition circuit, comprising:
   a light sensing detection module comprising a first transistor, a photosensitive unit and a storage capacitor, wherein the first transistor comprises a gate electrically connected to a charging control signal line, a first electrode electrically connected to a first fixed potential signal line, and a second electrode electrically connected to a cathode of the photosensitive unit; wherein an anode of the photosensitive unit is electrically connected to a first node; and wherein the storage capacitor comprises a first plate electrically connected to the first node, and a second plate electrically connected to a second fixed potential signal line;
   an acquisition module, wherein the acquisition module comprises a control terminal electrically connected to the first node, an input terminal electrically connected to a third fixed potential signal line, and an output terminal;
   an output module, wherein the output module comprises a control terminal electrically connected to a read control signal line, an input terminal electrically connected to the output terminal of the acquisition module, and an output terminal electrically connected to a read signal line; and
   a reset module comprising a control terminal electrically connected to a reset control signal line, an input terminal electrically connected to the second fixed potential signal line, and an output terminal electrically connected to the first node, wherein the output terminal is configured to provide a second fixed potential of the second fixed potential signal line to the first node in response to a reset control signal,
   wherein when performing fingerprint recognition, the first transistor controls, in response to a charging control signal, the photosensitive unit to charge the storage capacitor utilizing a photocurrent generated under illumination, wherein the acquisition module acquires a potential change of the first node, and wherein the output module outputs the potential change to the read signal line; and
   wherein the acquisition module comprises a second transistor, the second transistor comprising a gate electrically connected to the first node and a first electrode electrically connected to the third fixed potential signal line.

2. The fingerprint recognition circuit according to claim 1, wherein the storage capacitor has a capacitance value greater than a capacitance value of an equivalent parasitic capacitance of the photosensitive unit.

3. The fingerprint recognition circuit according to claim 1, wherein the second transistor is an N-type transistor, and a second fixed potential of the second fixed potential signal line is greater than a turn-on potential of the second transistor.

4. The fingerprint recognition circuit according to claim 1, wherein the reset module comprises:
   a third transistor, wherein the third transistor comprises a gate electrically connected to a reset control signal line, a first electrode electrically connected to the second fixed potential signal line, and a second electrode electrically connected to the first node.

5. The fingerprint recognition circuit according to claim 4, wherein the third transistor is a low-temperature polycrystalline oxide transistor or an amorphous silicon transistor.

6. The fingerprint recognition circuit according to claim 4, wherein the third transistor has a width to length ratio smaller than a width to length ratio of the first transistor.

7. The fingerprint recognition circuit according to claim 4, wherein the third transistor comprises an active layer, wherein the active layer comprises a channel region, a first heavily doped region electrically connected to the first electrode of the second transistor, a second heavily doped region electrically connected to a second electrode of the second transistor, a first lightly doped region arranged between the first heavily doped region and the channel region, and a second lightly doped region arranged between the second heavily doped region and the channel region.

8. The fingerprint recognition circuit according to claim 4, wherein the third transistor comprises an active layer, a gate layer, and a source-drain layer, and wherein, in a direction perpendicular to a plane of the active layer, an orthographic projection of the source-drain layer and the gate layer covers the active layer.

9. The fingerprint recognition circuit according to claim 4, wherein the third transistor is a double-gate transistor.

10. The fingerprint recognition circuit according to claim 1, wherein the output module comprises:
    a fourth transistor, wherein the fourth transistor comprises a gate electrically connected to the read control signal line, a first electrode electrically connected to a second electrode of the second transistor, and a second electrode electrically connected to the read signal line.

11. The fingerprint recognition circuit according to claim 1, wherein the photosensitive unit comprises a photodiode.

12. The fingerprint recognition circuit according to claim 1, wherein the photosensitive unit comprises at least two photodiodes connected in parallel.

13. The fingerprint recognition circuit according to claim 1, wherein the storage capacitor is a temperature compensation capacitor.

14. A fingerprint recognition method applied to the fingerprint recognition circuit according to claim 1, the fingerprint recognition method comprising:

during a light sensing detection period of a fingerprint recognition cycle, providing, by the first transistor, a first fixed potential of the first fixed potential signal line to the cathode of the photosensitive unit in response to the charging control signal;

charging, by the photosensitive unit, the storage capacitor utilizing the photocurrent generated under the illumination;

acquiring, by the acquisition module, a potential of the first node in response to a read control signal of the read control signal line; and reading, by the output module, a signal of the first node in response to the read control signal.

15. The fingerprint recognition method according to claim 14, wherein the acquisition module comprises a second transistor, and the second transistor comprises a gate electrically connected to the first node, a first electrode electrically connected to the third fixed potential signal line, and a second electrode;

the output module comprises a fourth transistor, wherein the fourth transistor comprises a gate electrically connected to the read control signal line, a first electrode electrically connected to the second electrode of the second transistor, and a second electrode electrically connected to the read signal line; and the light sensing detection period comprises a first detection sub-period and a second detection sub-period, wherein the fingerprint recognition method further comprises:

during the first detection sub-period, providing, by the first transistor, the first fixed potential to the cathode of the photosensitive unit in response to the charging control signal; and charging, by the photosensitive unit, the storage capacitor utilizing the photocurrent generated under the illumination in such a manner that the potential of the first node is raised and the second transistor is in a follower state; and during the second detection sub-period, continuously charging, by the photosensitive unit, the storage capacitor, and reading, by the fourth transistor, a detection signal indicating the potential of the first node through the read signal line in response to the read control signal.

16. The fingerprint recognition method according to claim 15, wherein the fingerprint recognition cycle further comprises a reset period before the first detection sub-period and/or after the second detection sub-period, wherein the fingerprint recognition method further comprises:

during the reset period, providing, by the reset module, a second fixed potential of the second fixed potential signal line to the first node in response to a reset control signal of the reset control signal line.

17. The fingerprint recognition method according to claim 16, wherein the second transistor is an N-type transistor, and the second fixed potential is greater than a turn-on potential of the second transistor.

18. The fingerprint recognition method according to claim 16, wherein the reset period comprises a first reset sub-period before the first detection sub-period and a second reset sub-period after the second detection sub-period; and the fingerprint recognition cycle further comprises a potential maintaining period between the second detection sub-period and the second reset sub-period, wherein during the potential maintaining period, the first transistor is turned off and the fourth transistor is turned off.

19. A display device, comprising:

a display panel having a display region, wherein at least a part of the display region is reused as a fingerprint recognition region, and the fingerprint recognition circuit according to claim 1 is provided in the fingerprint recognition region; and a processor electrically connected to the read signal line in the fingerprint recognition circuit and configured to recognize a fingerprint based on a signal read from the read signal line.

* * * * *